United States Patent
Dand et al.

(10) Patent No.: US 10,101,885 B1
(45) Date of Patent: Oct. 16, 2018

(54) INTERACT WITH TV USING PHONE CAMERA AND TOUCH

(71) Applicant: Amazon Technologies, Inc., Seattle, WA (US)

(72) Inventors: Dhairya Dand, Seattle, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 14/717,960

(22) Filed: May 20, 2015

(51) Int. Cl.
| | |
|---|---|
| *G06F 3/0484* | (2013.01) |
| *G06F 3/01* | (2006.01) |
| *G06F 3/00* | (2006.01) |
| *G06F 3/14* | (2006.01) |
| *G06K 9/00* | (2006.01) |

(52) U.S. Cl.
CPC ............ *G06F 3/0484* (2013.01); *G06F 3/005* (2013.01); *G06F 3/017* (2013.01); *G06F 3/1454* (2013.01); *G06K 9/00087* (2013.01)

(58) Field of Classification Search
CPC ........ G06F 3/0484; G06F 3/005; G06F 3/017; G06F 3/1454
See application file for complete search history.

(56) References Cited

U.S. PATENT DOCUMENTS

| 8,847,922 B1* | 9/2014 | Kurtz | G06F 3/0416 345/175 |
|---|---|---|---|
| 2008/0200205 A1* | 8/2008 | Liu | G06F 3/0346 455/556.1 |
| 2011/0170787 A1* | 7/2011 | Gum | G06K 9/00624 382/209 |
| 2013/0147970 A1* | 6/2013 | Herring | H04N 5/232 348/207.1 |
| 2014/0245181 A1* | 8/2014 | Jesudason | G06F 3/04883 715/753 |

OTHER PUBLICATIONS

Seokhee Jeon et al. "Interaction with large ubiquitous displays using camera-equipped mobile phones", Aug. 1, 2009, Springer Link, https://link.springer.com/article/10.1007/s00779-009-0249-0.*

* cited by examiner

*Primary Examiner* — Jennifer N To
*Assistant Examiner* — Amy P Hoang
(74) *Attorney, Agent, or Firm* — Kilpatrick Townsend & Stockton LLP

(57) ABSTRACT

Techniques described herein include a system and method for enabling a user to interact with content displayed on a display device by using a mobile device camera. In this disclosure, a service provider may receive image information from a user device. The image information may include information related to an image captured on the mobile device and may be used to identify a particular display device being targeted by the mobile device. The image information may also be used to determine a particular area of the display device currently being targeted. Once identified, user interactions on the mobile device may trigger corresponding actions on the display device.

20 Claims, 9 Drawing Sheets

INTERACT WITH TV USING PHONE CAMERA AND TOUCH

BACKGROUND

The quality and capabilities of mobile devices and input sensors are rapidly improving as advances are made in mobile device technology. For example, digital cameras on mobile devices can now capture millions of frames per second. As these vast technological improvements are being made, consumers are demanding increased functionality in day-to-day interactions.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described herein is a processor device configured to allow a user to interact with objects on a display, such as a television display, via the user's mobile device, such as a mobile phone. Specifically, the disclosure is directed to enabling a user to utilize the camera feature of a mobile device to manipulate the display of a display device. In this disclosure, a user is able to capture an image of at least a portion of the screen of a display device with a mobile device and manipulate objects on that portion of the screen of the display device using the screen of the mobile device. The portion of the display device screen captured in the image taken by the mobile device will be referred to as a target area.

In accordance with at least one embodiment, an image fingerprint corresponding to data displayed on a display device, such as a television, is created using the digital camera of the mobile device, such as a smart phone. The image fingerprint may include any identifying information that correlates to an object displayed on the screen, a portion of the screen of the display device, or the display device. For example, the image fingerprint may contain an indication of the display device targeted and the portion of the screen of the display device targeted. In some embodiments, the image fingerprint may also include an indication of a user interaction. In accordance with at least some embodiments, the image fingerprint may include data related to the user of the mobile device, such as a mobile device serial number, phone number, user name, or any other identifying material. The image fingerprint may be transmitted to a processor that controls the display device.

In accordance with at least one embodiment, the image fingerprint may be translated or interpreted by the receiving processor to determine an affected object or location of the display device. User interaction data received from the mobile device may then result in a manipulation of the determined object or location. In some embodiments, the image fingerprint may also include user data associated with the mobile device. The user data may be used to authenticate the user of the mobile device.

Figure 1:
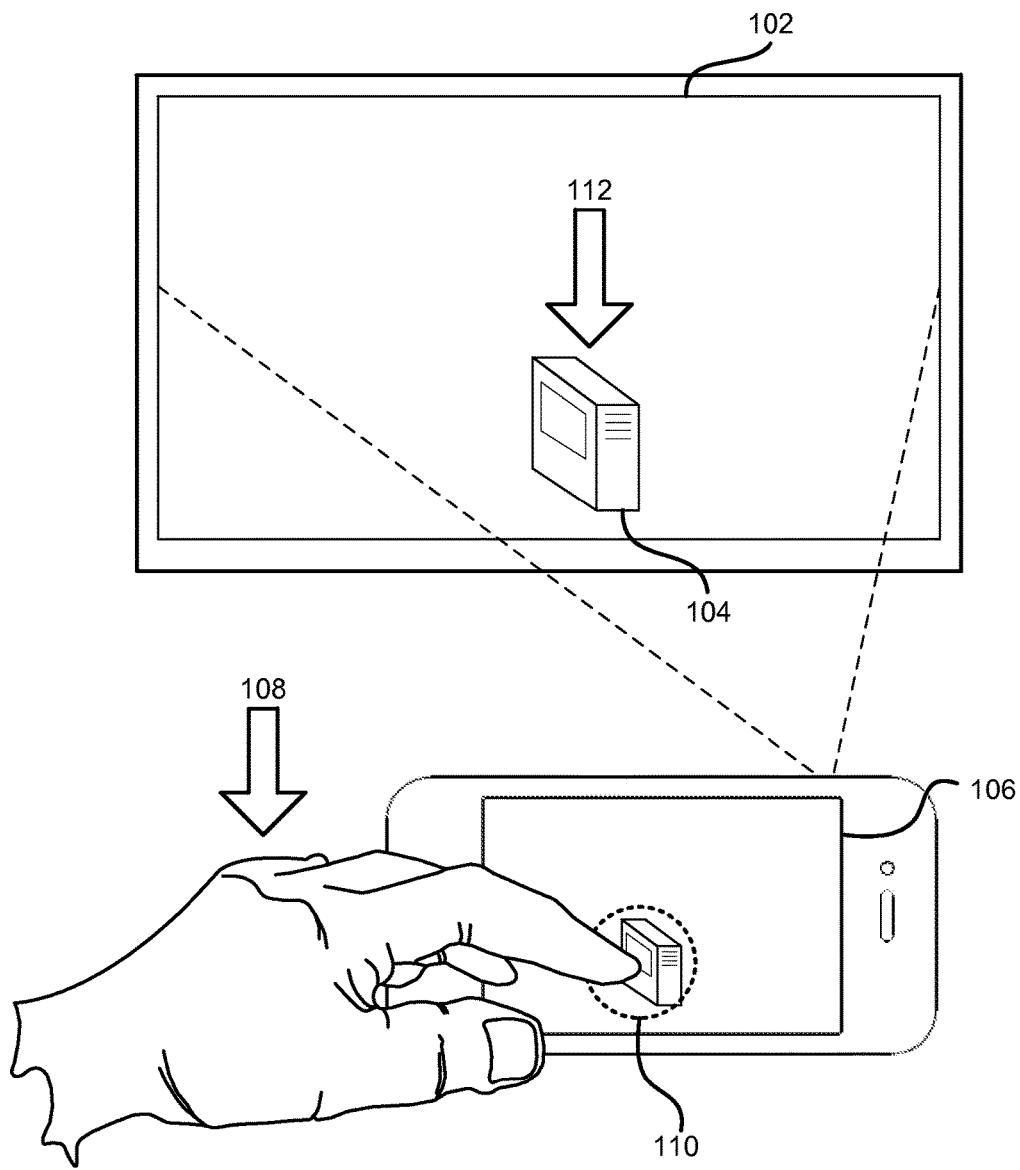
FIG. 1 depicts an illustrative display device manipulation engine in accordance with at least one embodiment.

FIG. 1 depicts an illustrative display device manipulation engine in accordance with at least one embodiment. In FIG. 1, a display device 102 is depicted as displaying image object 104. The image object 104 may be any image information displayed on the display device. For example, an image object 104 may be a picture, a gif, text, a video, or any other visually presented data.

In accordance with at least one embodiment, a user may capture an image of at least a portion of the display device using a digital camera of a mobile device 106. In at least some of these embodiments, the mobile device may determine the portion of the display device depicted in the captured image. For example, the display device may depict a screen with one or more fiducial markings (a marking used as a point of reference or measure), a color/light gradient, or any other suitable form of location tagging. A fiducial marking may be an image, barcode, pixel sequence, or any other suitable identification marking that may be recognized by a user device. Once the portion of the display device captured is identified, an image fingerprint may be created using at least that portion of the display device data. This will be described in greater detail with respect to FIG. 5 below.

In accordance with at least some embodiments, the mobile device may be configured to identify the image object 104 from the captured image. For example, the image object depicted on the display device may be identifiable as an image of a physical item, such as one that is available for sale from an electronic catalog. In this example, the mobile device or a remote resource accessible by the mobile device (e.g., the service provider) may employ edge detection, or any other suitable object recognition technique, to identify the particular item depicted. It should be appreciated that a variety of methods are known and available for enabling object recognition. It is intended that this disclosure encompass any suitable pattern recognition or digital geometry analysis technique known to one skilled in the art. For example, digital geometry analysis involves creating a discrete set of points from an object, such as a skeleton, while maintaining the digital topology (important topological properties such as boundaries, connectedness, or color patterns) of the object. In this method, the discrete data set for the object can be compared to known discrete data sets in order to determine a match and identify the object. By way of further example, pattern recognition techniques may include techniques such as sequence labeling, which assigns a class to each member of a sequence of values. In this technique, a labeled data set is created using the algorithmic assignment of a categorical label to each member of a sequence of observed values. In addition, object recognition techniques are available for analyzing stored data as well as real-time data. It should be appreciated that object recognition techniques may also be used to create image fingerprints. For example, a discrete data set for an object may be created using digital topology, which may then act as an image fingerprint. In some embodiments, the object recognition may be performed by a service provider in communication with the display device. An object identifier may then be presented along with the object for easier object identification. This will be described in greater detail with relation to FIG. 6 below. In at least some of the embodiments of this disclosure, an image fingerprint may be created using at least the identified image object data.

In accordance with at least some embodiments, an image fingerprint created from the image captured by the mobile device may be transmitted to at least one processor device in communication with the display device. For example, the image fingerprint may be transmitted to a service provider. The processor device may be located in the vicinity of the display device (it may even be attached to the display device) or it may be located remotely. The image fingerprint may be transmitted to the processor device in a number of ways. For example, the mobile device may transmit the image fingerprint using a telephony service, Bluetooth, a wireless local area network (such as Wi-Fi), infrared, or via any other suitable means of data communication.

Once received, the service provider may identify the particular display device that corresponds to the image fingerprint and create a connection between the mobile device and that display device. The identified display device may, in turn, be configured to respond to user interactions performed on the mobile device. For example, a user action 108 may be detected at interaction location 110 of the mobile device. The user action 108 and interaction location 110 may be communicated to the processor device in communication with the display device and it may be determined that interaction location 110 corresponds to object 104. In this example, a corresponding action 112 may be taken with regard to the object 104. In accordance with at least some embodiments, a user connection with a particular display device may be severed if no interactions are received over a threshold amount of time. In accordance with at least some embodiments, a connection may be established between a mobile device and a display device prior to sending an image fingerprint. For example, the mobile device may use infrared, wireless communication technology, or high frequency audio technology to connect to a display device. In at least some of these embodiments, an image fingerprint may be transmitted to the display device after establishing a connection.

It should be understood that a user action, such as user interaction 108, may be any action taken with regard to the mobile device. This may include a voice command, a text input, a gesture, or any other suitable method of interacting with a mobile device. For example, the act of holding the mobile device up so that an image of the display device is captured may be interpreted as input. Interactions, such as gestures, may be associated with actions to be performed at the display device in a number of ways. For example, interaction data may be stored locally on the mobile device, such that the user is able to customize (alter, edit, or update) particular interactions to be associated with particular actions. Interaction data may also be predetermined, in that specific user interactions are always associated with a particular action.

Figure 2:
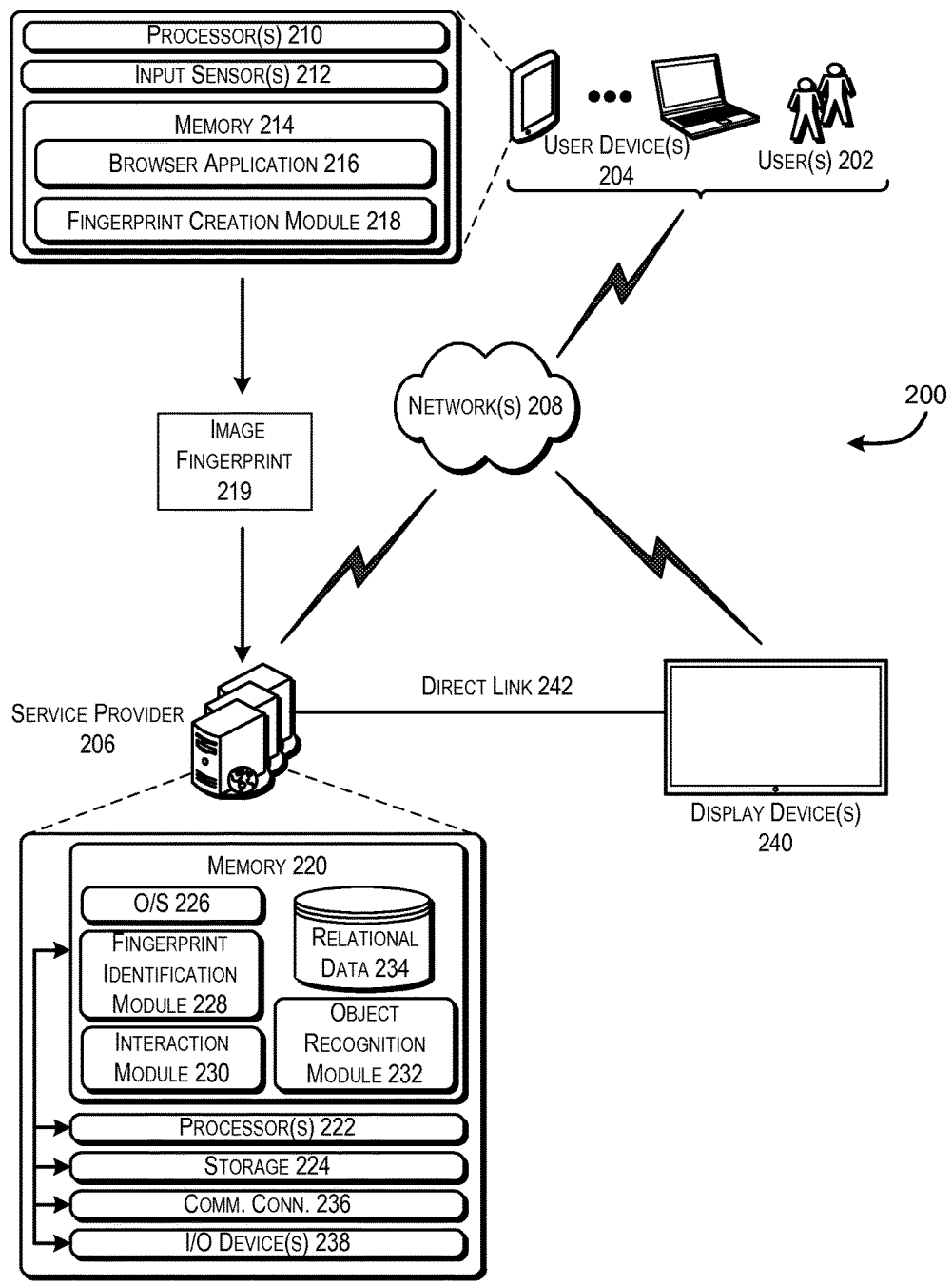
FIG. 2 depicts an illustrative example of a system or architecture in which techniques for enabling user interaction with a display device via a camera on a mobile device may be implemented.

FIG. 2 depicts an illustrative example of a system or architecture 200 in which techniques for enabling user interaction with a display device via a camera on a mobile device may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include a fingerprint creation module 218 that is capable of creating an image fingerprint from received digital image information. As pointed out earlier, an image fingerprint may include any identifying information that correlates to an object displayed on the screen, a portion of the screen of the display device, or the display device. Although sample architecture 200 depicts a fingerprint creation module 218 as being included in the contents of the memory 214 of the user device 204, some embodiments may not include a fingerprint creation module 218 in memory 214 of the user device 204. In those embodiments in which the fingerprint creation module 218 is not included in memory 214, input received by the input sensors 212 may instead be processed by the service provider 206. For example, image data captured by a digital camera of a mobile device may be streamed to the service provider 206, which may then create an image fingerprint 219 using the described techniques. It should also be understood that at least a portion of functionality depicted as being provided by the service provider may also be performed by the user device 204, such as by the fingerprint creation module 218. An image fingerprint 219, once created by the fingerprint creation module, may be transmitted to a service provider 206.

In some embodiments, the fingerprint creation module 218 may be configured to identify image data correlated to a portion of a screen on or object depicted on a display device and create an image fingerprint. In some embodiments, an image fingerprint may include compressed image data (such as a discrete data set created using an object recognition technique). In some embodiments, an image fingerprint may include an object identifier, or any data that may identify the particular object captured in the image of the display device. In some embodiments, the image fingerprint may include a user identifier, or any data related to a user's identity. Once created, the image fingerprint may be communicated to the service provider 206 over network 208.

In some examples, the network(s) 208 may include any one or a combination of many different types of networks, such as cable networks, the Internet, wireless networks, cellular networks, and other private and/or public networks. While the illustrated example represents the users 202 accessing the browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or host web content. The one or more subscription system(s) 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for translating and/or interpreting an image fingerprint received from a mobile device (fingerprint identification module 228), a module for interpreting user interactions and performing actions (interaction module 230). The memory 220 may also include a module for performing object recognition (object recognition module 232) as well as relational data 234, which provides data related to display devices, object catalogs, user interaction data, or any other relevant data. In some embodiments, the relational data 234 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 236 that allow the service provider 206 to communicate with a stored database, another computing device or server, user terminals, and/or other devices on the network(s) 208. The service provider 206 may also include input/output (I/O) device(s) and/or ports 238, such as for enabling connection with a keyboard, a mouse, a pen, a voice input device, a touch input device, a display, speakers, a printer, etc.

Additionally, the service provider 206 may be communicatively coupled to one or more display device(s) 240. The service provider 206 may communicate with display device(s) 240 via the network(s) 208 or over a direct link 242. In accordance with at least some embodiments, the display device(s) 240 may be thin-client devices capable of displaying output from the service provider 206.

Turning to the contents of the memory 220 in more detail, the memory 220 may include an operating system 226, a database containing relational data 234 and the one or more application programs or services for implementing the features disclosed herein, including a fingerprint identification module 228.

In some embodiments, the fingerprint identification module 228 may be configured to receive data from the fingerprint creation module 218 and determine an object or a portion of the display screen targeted by the user of the mobile device. For example, fingerprint identification module 228 may compare received object-related data (such as data created using an object recognition technique) to data displayed on one or more display devices. In some embodiments, the image fingerprint may contain an identification of the display device to which it corresponds.

In some embodiments, the fingerprint interaction module 230 may be configured to receive interaction data from the user device 204 and instruct or perform an action with regard to the determined object or portion of the display screen targeted by the user of the mobile device. For example, interaction module 230 may receive an indication that a user 202 has performed a gesture with relation to particular coordinates of a display device. In this example, the fingerprint identification module 228 may be called to identify the portion of the display device involved and the interaction module may perform an action with regard to that portion of the display device.

In addition to the fingerprint identification module 228 and the interaction module 230, the memory 220 may also include an object recognition module 232 in at least some embodiments. The object recognition module 232 may be configured to receive image data from the user device 204 or the service provider 206 and identify an item related to the image data. For example, object recognition module 232 may identify an item for which an image is to be displayed on a display device 240. In accordance with at least some embodiments, object recognition module 232 may create an object identifier to be displayed in conjunction with the item image. This is described in greater detail with respect to FIG. 6 below.

Relational data 234 may be predetermined or it may be dynamically generated. For example, object location data may be updated dynamically as objects displayed on a display device are moved, added, or removed. The number/identity of users interacting with a particular display device may be updated dynamically as image fingerprints are received from user devices or connections between display devices and user devices are severed.

Figure 3:
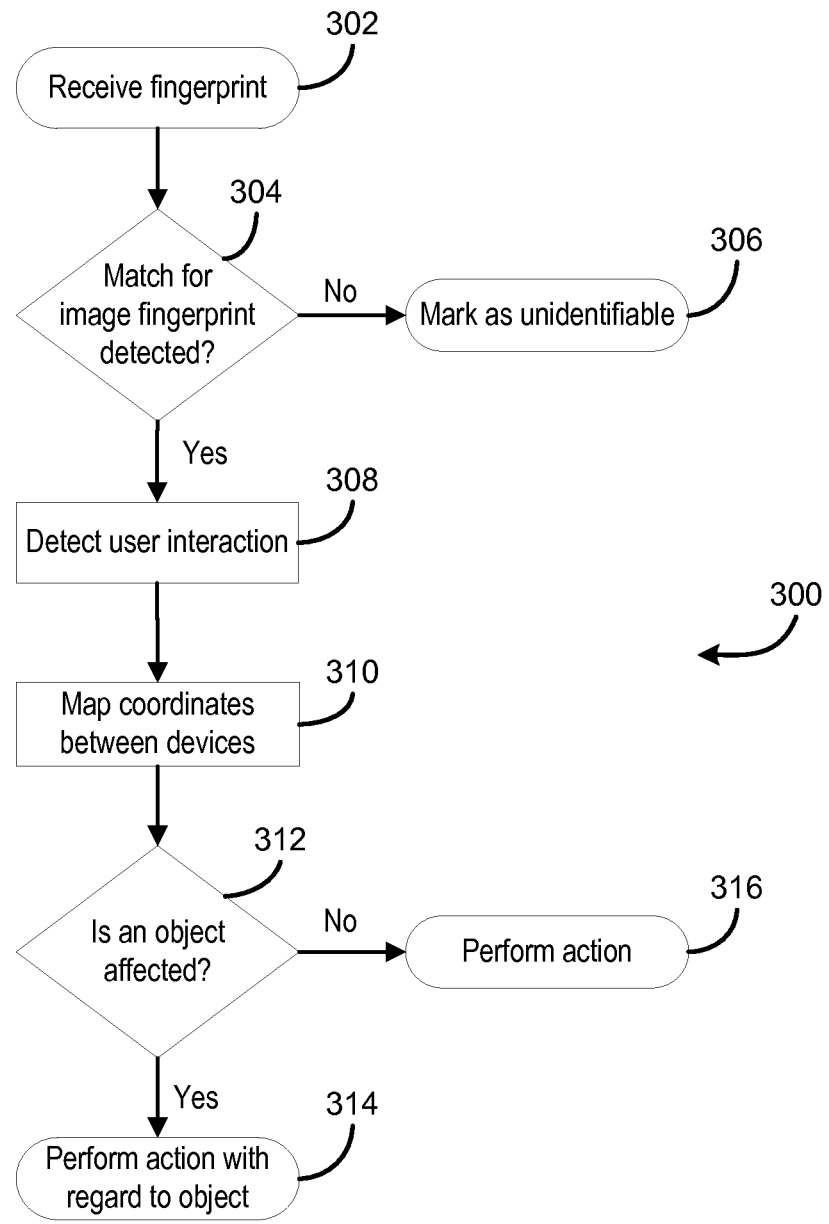
FIG. 3 depicts an illustrative flow chart depicting aspects of an example method for using a mobile device to interact with a display device in accordance with at least one embodiment of the current disclosure.

FIG. 3 depicts an illustrative flow chart depicting aspects of an example method for using a mobile device to interact with a display device in accordance with at least one embodiment of the current disclosure. Some or all of the process 300 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In accordance with at least one embodiment, the process 300 of FIG. 3 may be performed by at least the one or more subscription system providers 206 shown in FIG. 2. The code may be stored on a computer-readable storage medium, for example, in the form of a computer program including a plurality of instructions executable by one or more processors. The computer-readable storage medium may be non-transitory.

The process 300 may begin at 302 when an image fingerprint is received at the service provider after being sent by a mobile device, such as the mobile device 106. The fingerprint identification module 228 may determine which display device is correlated to the image fingerprint at 304. In accordance with at least some embodiments, the fingerprint identification module may compare pixel-related information in the image fingerprint with pixel or color information for one or more display devices. In accordance with at least some embodiments, the image fingerprint may include an identification of the display device that is used by the fingerprint identification module. In accordance with at least some embodiments, fingerprint information may be manually mapped to a display device. For example, a second user may receive the image fingerprint and provide an identification of a related display device. In at least some embodiments, a user may identify one or more objects in the image. In some embodiments, one or more aspects of the image fingerprint may be identified by one or more users of a crowdsourcing internet marketplace. A failure to find a match may result in the image fingerprint being disregarded or marked as unidentifiable at 306. In accordance with at least some embodiments, the image fingerprint may contain location information for the mobile device, which may be used to identify a display device near the mobile device. For example, an application installed on the mobile device may provide the service provider with an indication that the mobile device's coordinates are now within a predefined geographic area. It is envisioned that any regional monitoring technique (e.g., geo-fencing or a beacon system) may be used to narrow a list of potential display devices such that the service provider is able to more easily identify the relevant display device. For example, a mobile device that is associated with a particular consumer may indicate that it is within the vicinity of three particular beacons. In this example, a distance to each of the three beacons may be used to pinpoint the consumer's location. This may help the service provider identify a particular display device by eliminating from consideration any display device outside of a given radius from the mobile device. In some embodiments, the service provider may use information received from an accelerometer in the mobile device to track the mobile device's movement and provide updated location information.

Upon identifying the relevant display device, the service provider may create an association between the mobile device and the determined display device. In accordance with at least some embodiments, the image fingerprint may include an indication of a portion of the display device being targeted by the mobile device. In these embodiments, the service provider may identify a user interaction performed with respect to the mobile device at 308 as well as coordinates of the mobile device display affected by the user interaction. The coordinates of the user interaction may then be mapped to coordinates on the display device according to the association created from the image fingerprint at 310.

At 310, the service provider may map elements depicted in the image fingerprint to elements depicted on the display device. For example, the service provider may map particular sequences and/or color occurrences of pixels in the image fingerprint to similarly situated occurrences of pixels displayed by the display device. The fingerprint identification module may also use information related to pixels, the size and/or location of a fiducial marking, object identifiers, or any other suitable information from the image fingerprint to determine the coordinates of the area targeted by the mobile device. In some embodiments, image information may continue to be relayed to the service provider in order to track user device movements or new target areas of the display device. However, in some embodiments, the image fingerprint may be used only to identify the display device. Optimization techniques may be used to track mobile device movements once a display device is determined. For example, once a display device and target area are determined, movement information collected by input sensors may be used to track changes in the target area. For example, a gyroscope, compass, and/or accelerometer of the mobile device may be used to track changes to the target area. By way of further example, a user of the mobile device may capture an image of a display device on the mobile device. Initially, the service provider may receive the image (or an image fingerprint) and identify the display device as well as a portion of the display device being targeted by the mobile device. Once this identification has been made, the mobile device may communicate accelerometer information to the service provider, which may be used to update the targeted portion of the display device as it changes.

Once the affected coordinates of the display device have been determined, the service provider may determine whether an object is located at those coordinates at 312. If an object is located at the determined coordinates, then an action may be performed upon the affected object at 314 based upon the detected user interaction performed on the mobile device. Otherwise, an action may be performed with regard to the display device that does not involve a particular object based on the user interaction performed on the mobile device.

Figure 4:
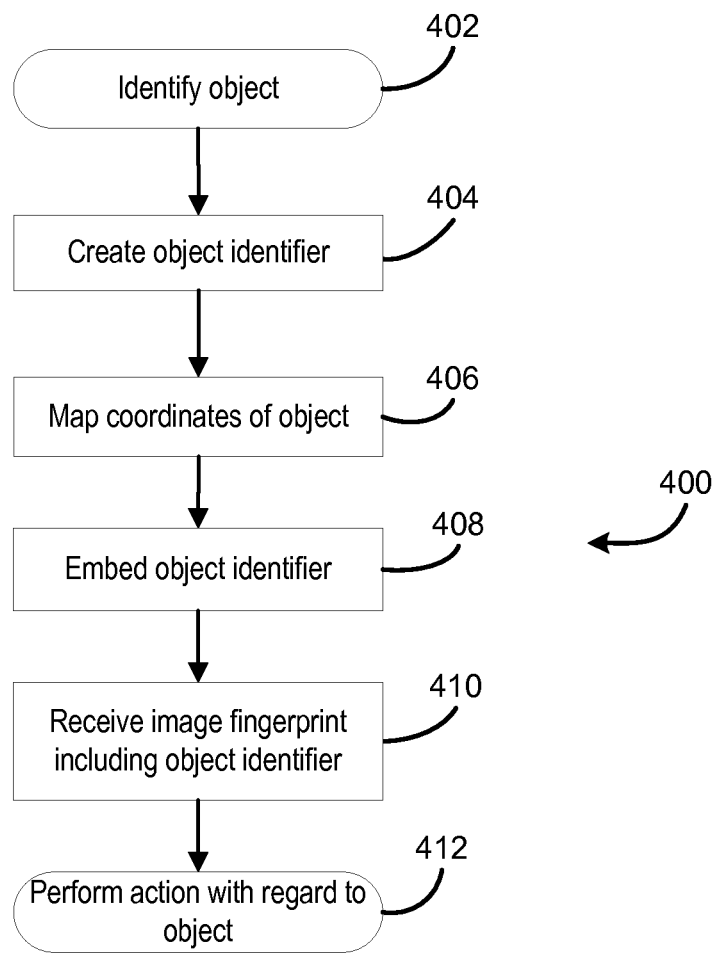
FIG. 4 depicts an illustrative flow diagram depicting aspects of an example method for embedding an object identifier into an object that can be used to interact with the object in accordance with at least one embodiment of the current disclosure.

FIG. 4 depicts an illustrative flow diagram depicting aspects of an example method for embedding an object identifier into an object that can be used to interact with the object in accordance with at least one embodiment of the current disclosure. The process 400 may begin at 402 when an object is identified at the service provider. In accordance with at least some embodiments, the service provider may employ one or more object recognition techniques to identify the object. In some embodiments, identification of the object may be done manually, such as by a person or via a crowdsourcing service.

In accordance with at least some embodiments, the service provider may create an object identifier at 404. An object identifier may be a barcode, quick response code (QR code), an item name, or any other suitable means of providing an identification of the object. In at least some of these embodiments, the object identifier may be displayed on the display device at the coordinates of the object at 406. The object identifier may be embedded in the material displayed on the display device at 408. To embed an object identifier, the object identifier may be associated with the displayed material in such a way that it is detectable at least by using enhanced means, such as the digital camera of a mobile device. In some embodiments, the object identifier may be displayed at the same coordinates as the corresponding object interchangeably. For example, a 120 Hz display device can display frames at a rate of 120 times per second. On such a display device, an object may be displayed at a particular location for 119 of those times and the object identifier may be displayed at the same location the $120^{th}$ time. In this way, although the object identifier and the object are displayed at the same location, only the object itself and not the object identifier may be perceivable by a person. A digital camera on a mobile device, however, is capable of capturing millions of images per second and is capable of reading the object identifier. In accordance with at least some embodiments, object identifiers may be embedded in output of a display device for each object displayed.

In accordance with at least some embodiments, information related to an object identifier may be received from a mobile device at 410. For example, object identifier information may be included in the received image fingerprint. The service provider may receive an indication of a user interaction performed with respect to the object identifier in addition to the image fingerprint. The service provider may perform an action associated with the indicated user interaction with respect to the displayed object at 412.

Figure 5:
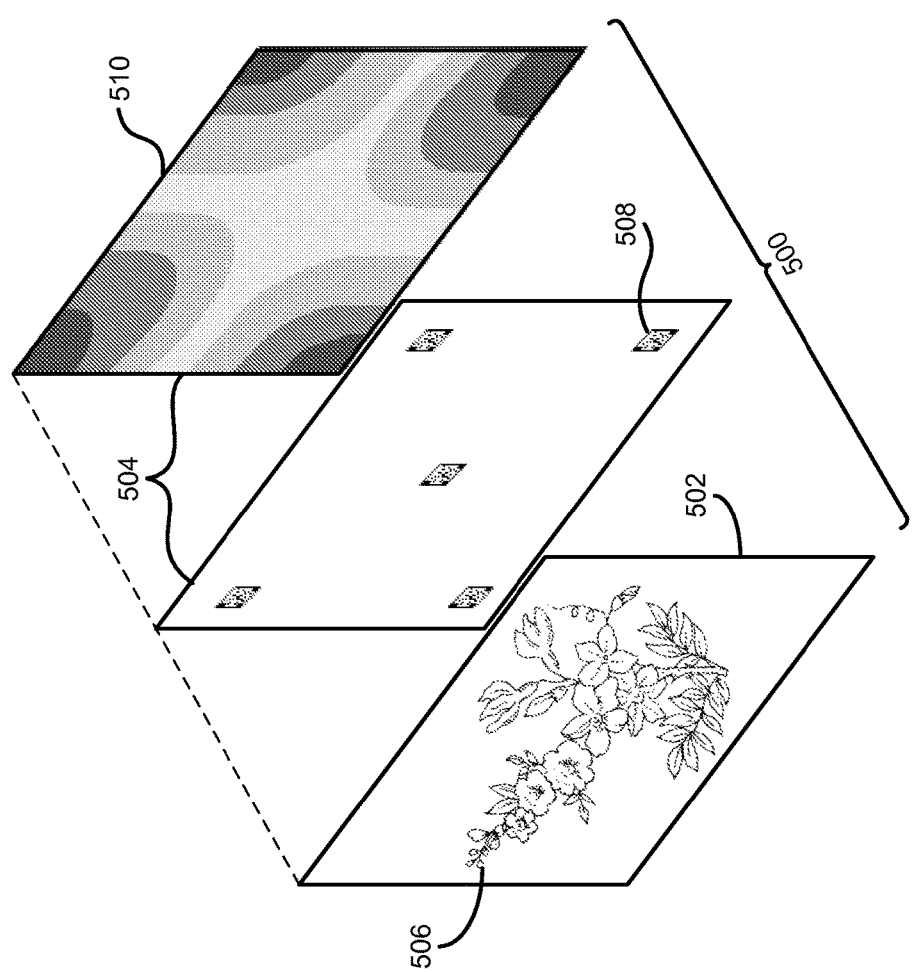
FIG. 5 depicts an illustrative example of coordinate identification according to displayed fiducial markings in accordance with at least one embodiment.

FIG. 5 depicts an illustrative example of coordinate identification according to displayed fiducial markings in accordance with at least one embodiment. In FIG. 5, various elements of screen output 500 displayed via a display device, such as the display device 102, are presented. In accordance with at least one embodiment, a screen foreground 502 may be presented in addition to one or more background(s) 504. It is intended that the foreground 502, which may contain one or more objects 506, should be should be displayed so that it is visible to a typical person without the assistance of a mobile device. The background 504, however, may be embedded into the foreground image so that it is not easily detectable by a person without assistance. For example, the background image may be displayed for such a short amount of time that it is not detectable by a normal human eye. In this example, the background image may be presented by the display device for only a single frame (resulting in the background being shown for a few milliseconds).

In accordance with at least one embodiment, one or more fiducial marking(s) 508 may be presented throughout a background image 504. Fiducial markings may be embedded throughout a display device's screen to provide context regarding, display device identification, target area coordinates, and/or object size. These fiducial markings may be embedded so that they are not readily visible to the human eye or they may be readily apparent. In some embodiments, fiducial markings may include an identifier of the display device and/or coordinates of the fiducial marking. In these embodiments, the target area may be determined by analyzing the coordinates of the fiducial markings captured in an image relative to the size of the fiducial markings.

In accordance with at least one embodiment, a background image of a display device screen may consist of a color gradient 510. A color gradient 510 is any background in which the color of a particular pixel is determined based on its location or coordinates. For example, a screen may be colored red as a function of position along the X-axis from zero on the left of the screen to 255 on the right of the screen. Additionally, the screen may be colored blue as a function of position along the Y-axis from zero on the bottom of the screen to 255 on the top of the screen. In these embodiments, an image captured of the display device screen may be analyzed to determine a location that is being targeted by analyzing the red and blue values of the pixels in the target area. For example, if a target area in a captured image has a red value of 128 and a blue value of 250, then it may be determined that the target area is centered along the X-axis and near the top of the screen along the Y-axis. Furthermore, an additional color value (such as a green value) may also be used to convey additional information related to the background, the targeted location, or the display device. For example, a repeating sequence of varying green values in pixels may be used to identify a particular display device.

In accordance with at least one embodiment, a target area may be determined by analyzing background or foreground details. For example, pixel mapping may be used to determine a target area. In this example, data related to a number of pixels may be normalized into a vector and compared to the pixels displayed on a display device. In accordance with at least some embodiments, the mobile device may process the captured image data, such as by performing object recognition and/or making a coordinate determination. An object identity or location information may then be included in an image fingerprint that is sent to the service provider. In at least some embodiments, the image fingerprint may include raw data and at least some of the processing may be done at the service provider. For example, an image fingerprint may include pixel-related data that is used by the service provider to perform pixel mapping or object recognition.

By way of example, in one illustrative scenario, a user may capture an image of the screen of a display device with a camera of a mobile device. In this scenario, the camera may capture fiducial markings and/or background information that may be used to determine an area targeted by the mobile device camera. The mobile device may process the fiducial marking data or background information (e.g., by normalizing the data) and include it into an image fingerprint, which may then be sent to a service provider in communication with the display device. The service provider is then able to use the image fingerprint data to determine the display device being targeted as well as the targeted area of the display device. In this scenario, the targeted area may be dynamically updated as the image taken by the mobile device camera is shifted, zoomed in or out, or otherwise altered. Once the targeted area is identified, the service provider may identify one or more objects located within the targeted area of the display device screen. As a user interacts with these objects on the screen of the mobile device, the service provider may cause actions to be performed with regard to the identified objects. For example, the user may be able to move the objects, remove objects, add objects, rate objects, open objects, purchase an item related to the object, or perform any other suitable action with regard to the object. In some embodiments, the user may have the ability to interact with the foreground without relation to an object. For example, the user may be able to write on the display device screen using the screen of the mobile device. The subsequent writing by the user may then be treated as an object, which may be interacted with.

Figure 6:
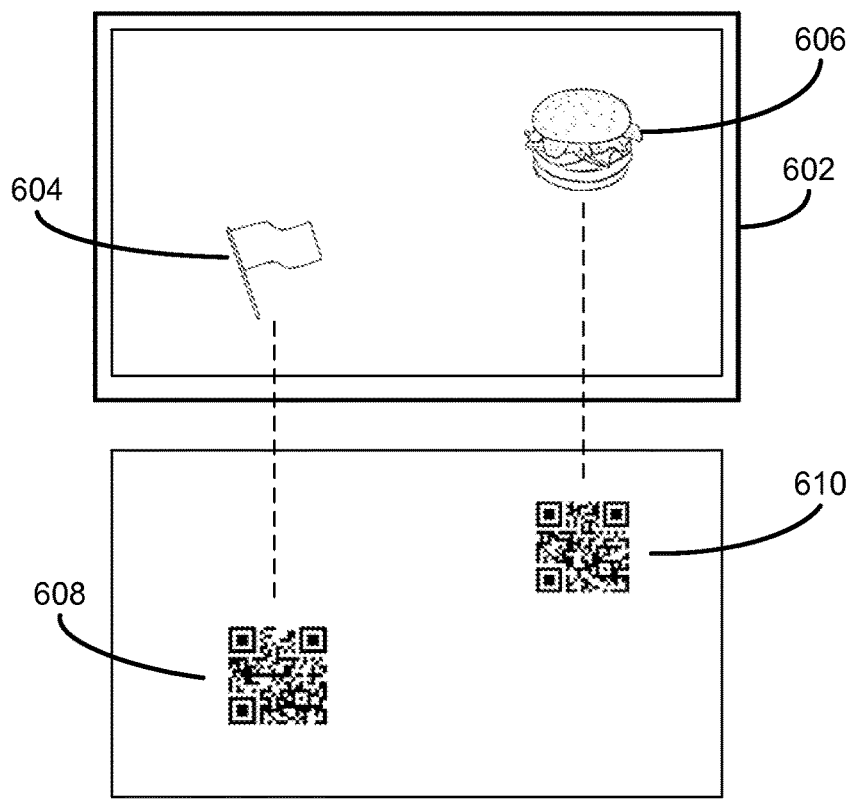
FIG. 6 depicts an illustrative example of object identifiers displayed along with objects in accordance with at least one embodiment.

FIG. 6 depicts an illustrative example of object identifiers displayed along with objects in accordance with at least one embodiment. In FIG. 6, a display device 602 is depicted as displaying objects 604 and 606. In addition, corresponding object identifiers 608 and 610 are depicted as being displayed at the same coordinates as their corresponding objects 604 and 606. In this illustrative example, the object identifier may be embedded into the object image, or at the object location, such that actions that affect the object image also affect the object identifier. For example, the service provider may maintain one set of coordinates for both the object and its corresponding object identifier. Additionally, an object identifier may be dynamically updated as new information is received about the object. For example, where the object identifier is a QR code, the service provider may detect a change in the state of the object and a new QR code may be generated to replace the current QR code. By way of a more specific example, an object identifier may include the coordinates of the object being identified, and if the object is moved, then the object identifier may be updated to include the new coordinates of the object.

In accordance with at least one embodiment, the service provider may perform object recognition analysis with regard to one or more objects displayed on the display device. Once identified, information related to the identified object may be used to construct an object identifier, which may then be associated with the object. In some embodiments, a user may be able to add an object to a display device using a mobile device. In at least some of these embodiments, the service provider may identify the object added to the display device by the mobile device and communicate at least some object information to the mobile device. In this way, object recognition may be performed by the service provider instead of by a mobile device, which may free up processing power of the mobile device.

In accordance with at least some embodiments, a video may be displayed on a display device that contains one or more objects. In some of these embodiments, coordinates of the object may be tracked throughout the video used in compiling object data which may be stored separately from the associated video. The display device, when playing the video content, may then embed one or more object identifiers in accordance with the stored object data. For example, a movie may be stored in a common video format. Additionally, the service provider may maintain information related to object identifiers that are associated with objects displayed throughout the video. When the video is played, the display device may be configured to embed or insert the stored object data that is associated with the video. By doing this, a mobile device may have the ability to identify the one or more objects depicted in the video without having to perform object recognition. For example, video formats are typically stored with frame rates between 24 Hz and 60 Hz. However, typical display devices may have a frame rate of at least 60 Hz and sometimes much higher. To account for the difference in frame rates between video formats and display devices displaying the video, frames from the video source may be displayed for more than one frame on the display device. Additionally, some display devices may insert frames with interpolated frame data to smooth image motion. In some embodiments of the current disclosure, the stored object data may be inserted in a frame between video frames. For example, when a 60 Hz video is played on a 120 Hz display device, each frame from a one second chunk of the video may be displayed twice except for the $60^{th}$, which may be displayed only once. The $120^{th}$ displayed frame (which would normally include the $60^{th}$ video frame duplicated) may instead be replaced with object identifier information. In some other embodiments, both the $60^{th}$ frame and the $120^{th}$ frame displayed by the display device may be replaced with object identifier information.

Figure 7:
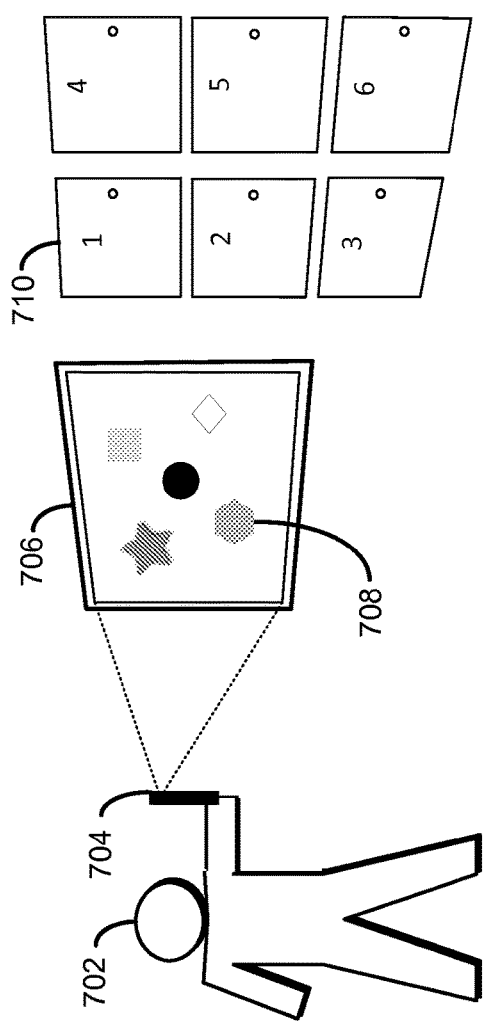
FIG. 7 depicts an illustrative example user authentication via mobile device interaction with a display device in accordance with at least one embodiment.

FIG. 7 depicts an illustrative example user authentication via mobile device interaction with a display device in accordance with at least one embodiment. In FIG. 7, a user 702 is depicted as having possession of a mobile device 704. A user's mobile device 704 may be associated with that user. For example, the serial number, phone number, or login information associated with an application of the mobile device 704 may be registered to a particular user 702. In at least some embodiments, in order to interact with a display device 706 using a mobile device 704, the user 702 may be required to log into an account. In accordance with at least some embodiments, information related to the user 702 may be conveyed to the service provider. For example, at least some user information may be included in an image fingerprint that is sent to the service provider.

In accordance with at least one embodiment, the display device 706 may depict one or more objects 708. The objects 708 may be stationary, moving, or the display may be transitioning from image to image. In accordance with at least some embodiments, an image fingerprint sent from the mobile device 704 associated with user 702 that includes at least a portion of the display device may be used to authenticate a user (provide evidence that the user is present). In accordance with at least some embodiments, a user interaction may be required. For example, the user may be required to interact with various objects depicted in order to provide authentication. By way of further example, the user may be required to enter a code or interact with a sequence of objects in a particular order to provide authentication.

In accordance with at least one embodiment, some objects 708 may only be interacted with by particular users or groups of users. For example, the display device 706 may detect, via wireless signal, that a particular mobile device 704 is nearby. The display device may then present an advertisement directed to the user 702 associated with that particular mobile device 704. In this example, the display device may be configured so that the objects 708 depicted in relation to the advertisement may only be interacted with using the particular mobile device 704 associated with user 702. In at least some embodiments, the display device may be configured so that the objects 708 depicted may only be interacted with by a group of people. For example, some user interaction options may be made available only to members of a particular status, or those that are pre-approved. In these embodiments, a user interaction that is not authorized may result in an notification to the mobile device that the user is not authorized or it may simply result in no action being taken in relation to the user interaction.

In accordance with at least one embodiment, the user 702 may be associated with a user account that may be billed. For example, a user may approach a vending machine with an attached display device that depicts one or more items available from the vending machine. By using the mobile device to interact with the display device, the user may be able to make a purchase of one or more of the available items. In this example, the item would be vended by the machine and the user's account may be billed, allowing the user to purchase the item without providing an additional payment method.

In accordance with at least one embodiment, in response to receiving a user interaction, the user 702 may be granted access to a secure location 710. For example, the user may have a package that is delivered to and/or stored in the secure location 710. When the user 702 is authenticated, using the disclosed technique, he or she may be granted access to the secure location 710 in order to retrieve the package. A secure location, such as secure location 710, may be any space to which access may be controlled.

Figure 8:
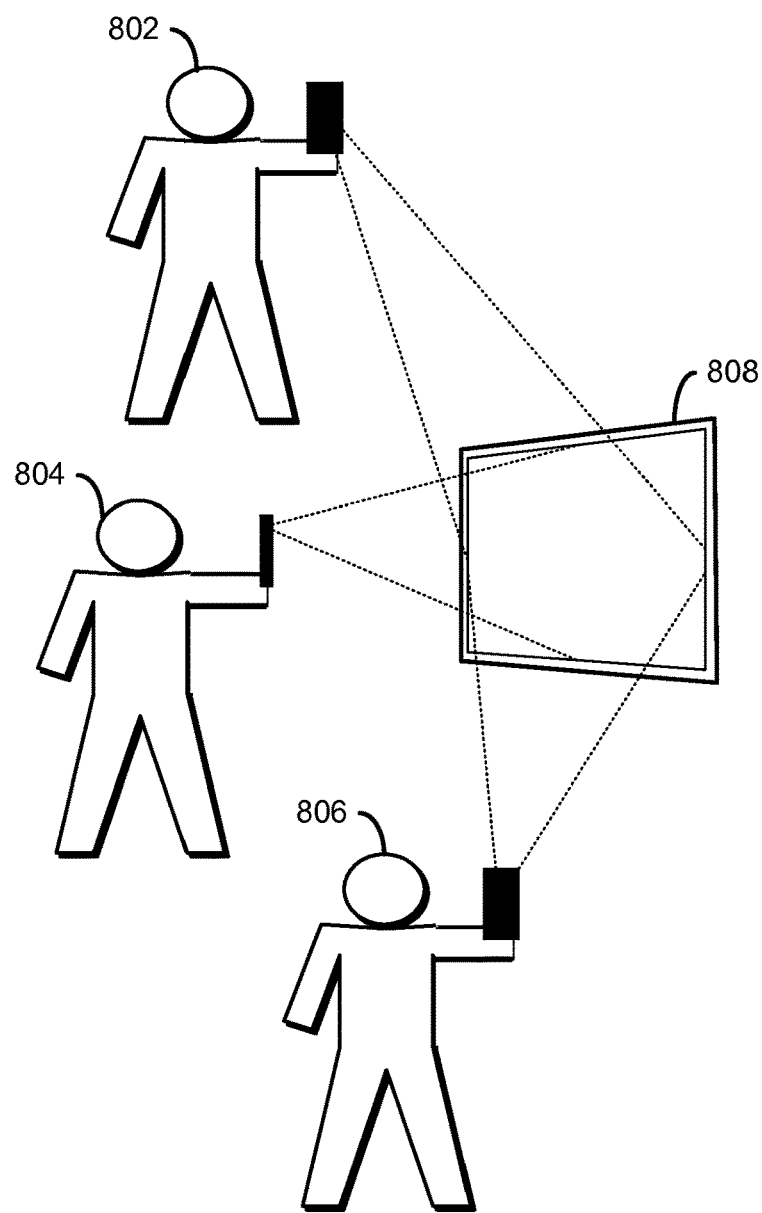
FIG. 8 depicts an illustrative example multi-user display device interaction in accordance with at least one embodiment.

FIG. 8 depicts an illustrative example multi-user display device interaction in accordance with at least one embodiment. In accordance with at least one embodiment, the service provider may be capable of establishing and maintaining multiple user device connections with one or more display device. For example, in FIG. 8, multiple users 802, 804, and 806 are depicted as interacting with display device 808. In accordance with at least one embodiment, user 802 may be given authority to perform actions that user 804 and/or user 806 are not authorized to perform and vice versa. For example, a user may be associated with a premium status or class. In this example, although each user may be able to view each of the objects displayed, only the premium user may be authorized to purchase one or more of the objects displayed. In a second example involving an interactive game, one or more users (or players) may be able to unlock actions that are not available to other users.

In accordance with at least one embodiment, user 802 may be authorized to interact with particular objects that user 804 and/or user 806 are not authorized to interact with and vice versa. For example, in one illustrative scenario, two users (such as users 802 and 804) may be playing a game on the display device. In this scenario, each of user 802 and 804 may have control over only his or her game pieces. Although the mobile device may be capable of identifying each game piece object, only actions involving a user's own game pieces may be performed.

In accordance with at least one embodiment, one or more users may use a mobile device to add an object to the screen of display device 808. In at least some of these embodiments, the service provider may perform object recognition with regard to the object added by the user and may embed an object identifier in the added object. In some embodiments, another user may be able to remove the object, or move it to his or her own mobile device. In this way, digital objects may change hands. For example, a display device may act as a digital library. A first user may have rights (such as ownership rights) in a particular book, song, or other suitable digital product that they are not currently using. The first user may use his or her mobile device to place an image associated with the digital product onto the display device. A second user may then use his or her mobile device to select the image associated with the digital product and may be given a subset of rights. By way of a more specific example, a first user may have an account with a service provider having a digital library. The user may elect to lease out a song that the user owns for a given period of time. By transferring the digital product to a second user, the second user may be granted the first user's rights to the digital product for the given period of time. After that time, the digital product may automatically be removed from the second user's mobile device and the rights in that digital product may revert to the first user. In accordance with at least some embodiments, the display device may facilitate anonymous transfers of rights. For example, a first user may add a digital product to the display device and a second user may take it from the display device. In this example, the first user and the second user may not be given any indication as to the identity of the other user.

Figure 9:
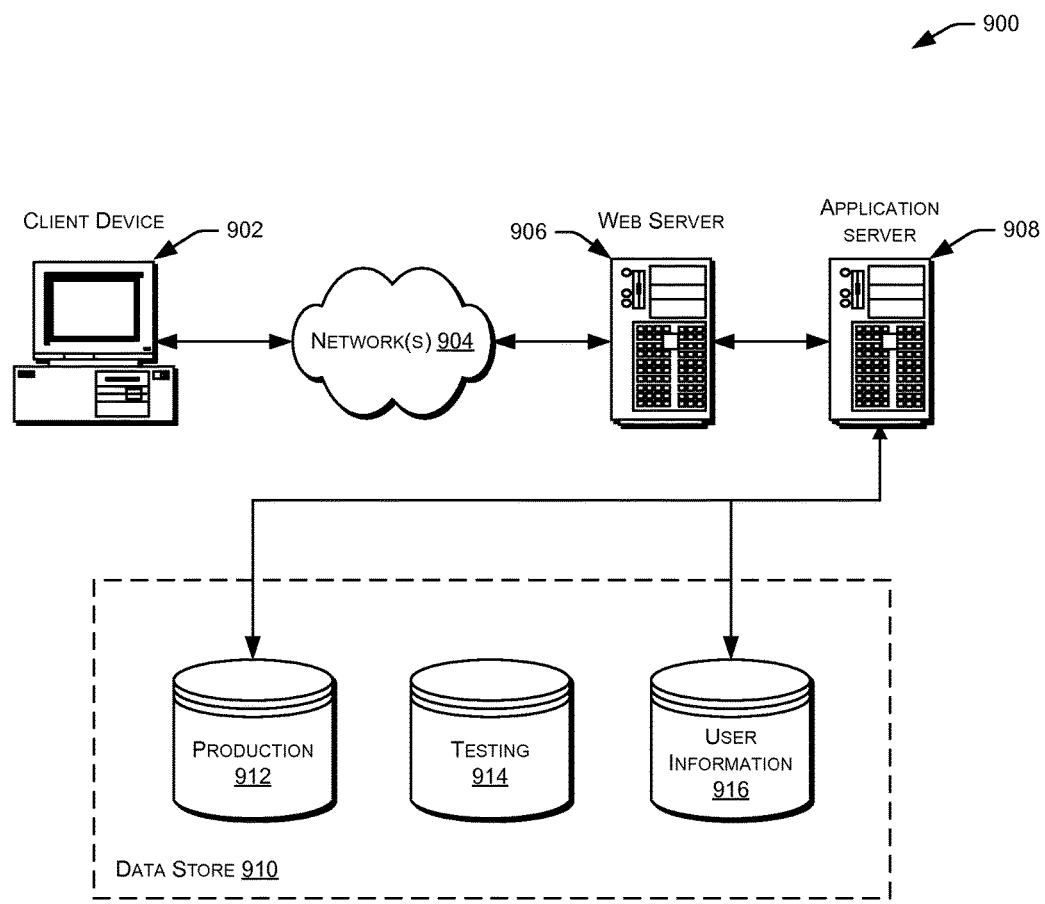
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for enabling user interaction with a display device via a mobile device, comprising:
    receiving, from the mobile device, image information captured by the mobile device related to at least a portion of the display device, the image information including an image of one or more elements displayed on the display device, each of the one or more elements associated with fiducial markings, the image information comprised of a number of frames, wherein a threshold number of the number of frames include fiducial markings embedded in the image information at the same coordinates as the respective one or more elements instead of the respective one or more elements, the threshold number being determined such that the frames including the fiducial markings are displayed between frames including the one or more elements for a portion of time on the display device and frames including the one or more elements are displayed for the remainder of the time on the display device such that the fiducial markings are not readily perceivable to a human eye on the display device while being ascertainable by the mobile device;

identifying the one or more elements included in the image information based on the fiducial markings associated with each of the one or more elements;

generating, based on the identified one or more elements displayed on the display device, an image fingerprint;

identifying, by mapping the image fingerprint to at least a portion of a second image fingerprint associated with the display device, the display device at least partially depicted in the image information captured by the mobile device;

determining, based on the image fingerprint, a position of the at least partially depicted portion of the display device;

receiving, from the mobile device, an indication of a user interaction performed and a screen location related to the user interaction based on the determined position; and providing, to the display device, instructions for performing an action associated with the indicated user interaction with regard to the at least partially depicted portion of the relevant display device at the screen location.

2. The computer-implemented method of claim 1, wherein the indicated user interaction is a gesture.

3. The computer-implemented method of claim 1, wherein the at least partially depicted portion of the display device is identified using pixel mapping or object recognition.

4. A system, comprising:

a processor; and a memory including instructions that, when executed with the processor, cause the system to, at least:

receive image information from a user device, the image information including information related to an image displayed by a display device captured by the user device, the image information comprised of a number of frames, a portion of the number of the frames including one or more fiducial markings embedded into the image information displayed by the display device at the same coordinates as respective foreground images, the portion of the number of frames including the one or more fiducial markings being displayed for a portion of time on the display device and being replaced by frames including the respective foreground images for the remainder of the time on the display device, wherein the portion of the number of the frames is below a threshold number of frames such that the portion of time that the one or more fiducial markings are displayed is small enough that the one or more fiducial markings are not readily perceivable by a human eye while being ascertainable by the user device;

process information associated with the fiducial markings to determine, based at least in part on the received image information and a location of each of the fiducial markings, a target area of the image displayed by the display device;

receive at least one user input from the user device, the user input corresponding to a location on the screen of the user device with respect to the fiducial markings; and perform an action, based at least in part on the user input, with regard to the target area of the display device, the target area determined based on the location on the screen of the user device.

5. The system of claim 4, wherein the instructions further cause the system to at least identify an object displayed on the display device based at least in part on the object being located within the target area.

6. The system of claim 5, wherein the action performed with regard to the target area of the display device is an action performed on the identified object.

7. The system of claim 6, wherein the action performed is at least one of moving the object, removing the object from the display device, adding the object to the display device, rating the object, opening the object, or purchasing an item related to the object.

8. The system of claim 4, wherein the instructions further cause the system to at least identify an object displayed on the display device using an object recognition technique.

9. The system of claim 8, wherein at least one fiducial marking of the one or more fiducial markings comprises an object identifier created for the identified object and displayed with the identified object.

10. The system of claim 9, wherein the object identifier is embedded at the same coordinates of the object on the display device.

11. The system of claim 4, wherein the instructions further cause the system to at least establish a connection between the processor and the user device in response to receiving the image information.

12. A non-transitory computer readable storage medium storing specific computer-executable instructions that, when executed by a processor, cause a computer system to at least:

receive, from a user device, an image fingerprint representing information captured by the user device of an image displayed by a display device, the image comprising a number of frames, the image fingerprint generated based on one or more fiducial markings embedded into a portion of the number of frames at the same coordinates as one or more respective foreground images and displayed on the display device for a portion of time, the portion of the number of frames being replaced by the respective foreground images for the remainder of the time on the display device, the portion of the number of frames determined to be below a threshold number of frames such that the fiducial markings are caused to not be readily perceivable to a human eye while being ascertainable by a mobile device;

determine, based at least in part on the received image fingerprint, the display device;

receive at least one user input from the user device, the user input including an indication of a location on a screen of the user device;

determine, based at least in part on the received user input, an action to be performed; and provide instructions to the display device to perform the determined action with regard to an object displayed on the appropriate display device based at least in part on the location on the screen of the user device.

13. The non-transitory computer readable storage medium of claim 12, wherein the image fingerprint includes an identification of a user of the mobile device.

14. The non-transitory computer readable storage medium of claim 13, wherein the computer system is further caused to at least authenticate a user based at least in part on the received image fingerprint.

15. The non-transitory computer readable storage medium of claim 14, wherein the user is granted access to a secure location based at least in part on the received image fingerprint.

16. The non-transitory computer readable storage medium of claim 14, wherein the determined action is a purchase transaction that is completed with regard to the object displayed on the appropriate display device.

17. The non-transitory computer readable storage medium of claim 15, wherein the purchase transaction is completed by billing an account associated with the user.

18. The computer-implemented method of claim 1, wherein the fiducial markings are quick response (QR) codes.

19. The computer-implemented method of claim 1, wherein the fiducial markings are displayed for a single frame per second on the display device and the one or more elements are displayed for the remainder of the time on the display device.

20. The computer-implemented method of claim 1, wherein the threshold number is determined based on a refresh rate of the display device.

* * * * *